United States Patent [19]

Morlock

[11] Patent Number: 4,539,921
[45] Date of Patent: Sep. 10, 1985

[54] DRILL FRAME CONSTRUCTION

[75] Inventor: Ruben D. Morlock, Jamestown, N. Dak.

[73] Assignee: Haybuster Manufacturing, Inc., Jamestown, N. Dak.

[21] Appl. No.: 562,271

[22] Filed: Dec. 16, 1983

[51] Int. Cl.³ .............................................. A01C 5/00
[52] U.S. Cl. ...................................... 111/52; 111/73; 111/85; 172/310; 172/253
[58] Field of Search ............... 111/52, 53, 55, 58, 111/59, 66, 85, 54, 56; 172/30, 250, 253, 310, 311, 243, 249, 251, 252–254, 236

[56] References Cited

U.S. PATENT DOCUMENTS

| | | | |
|---|---|---|---|
| 1,211,929 | 1/1917 | Fowle | 111/66 |
| 2,657,652 | 11/1953 | Graham | 111/64 |
| 2,788,725 | 4/1957 | Wilkey et al. | 97/10 |
| 2,951,458 | 9/1960 | Wade et al. | 111/52 |
| 3,224,347 | 12/1965 | Seaman | 94/10 |
| 3,705,560 | 12/1972 | Lappin | 111/52 X |
| 4,077,478 | 3/1978 | Neukom | 172/267 |
| 4,088,083 | 5/1978 | Dail | 111/85 X |
| 4,116,140 | 9/1978 | Anderson et al. | 111/52 |
| 4,311,104 | 1/1982 | Steilen et al. | 111/85 |
| 4,359,100 | 11/1982 | Weichel | 172/30 |
| 4,377,979 | 3/1983 | Peterson et al. | 111/85 X |
| 4,407,371 | 10/1983 | Hohl | 111/59 |

FOREIGN PATENT DOCUMENTS 525840  5/1955  Italy ...................................... 111/52

Primary Examiner—Robert A. Hafer
Assistant Examiner—Danton D. DeMille
Attorney, Agent, or Firm—Kinney & Lange

[57] ABSTRACT

A modular drill frame construction which can assume configurations for standard seeding-drive fertilizer application, and with a modular section added, used for side banding of fertilizer, that is, depositing fertilizer between the normal rows of seed, and by merely changing a tool bar become a row crop planting with side banding option. The modular frame constructions are easily inserted, and the various components are easily removed and replaced for the particular configuration that the farmer wishes to use.

6 Claims, 10 Drawing Figures

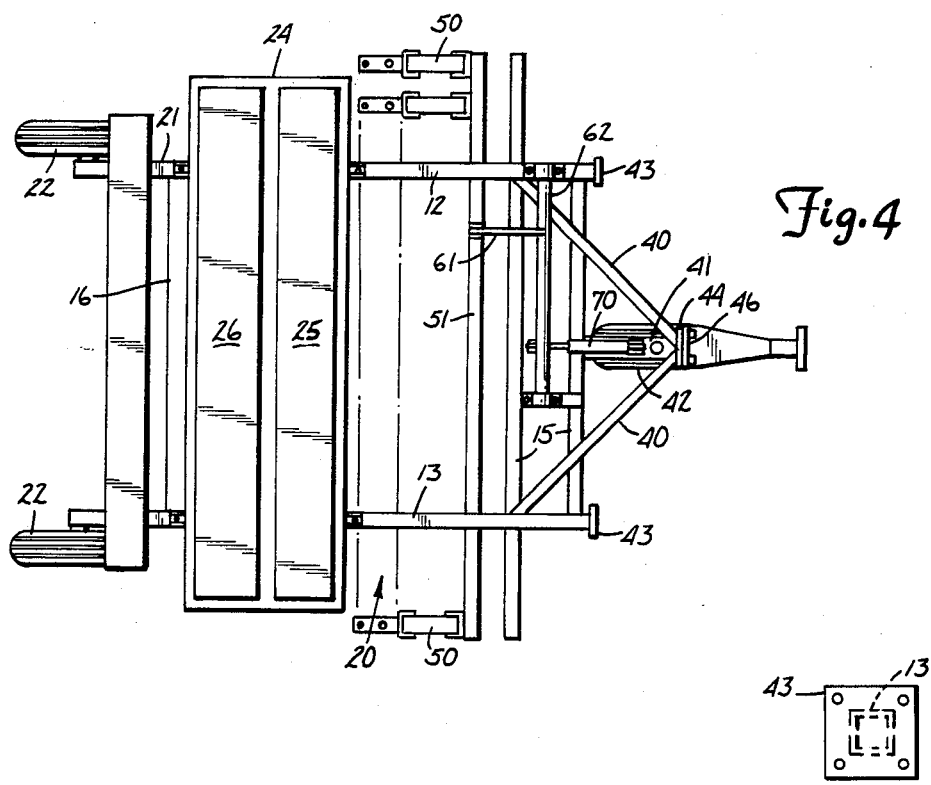
Fig. 4
Fig. 7
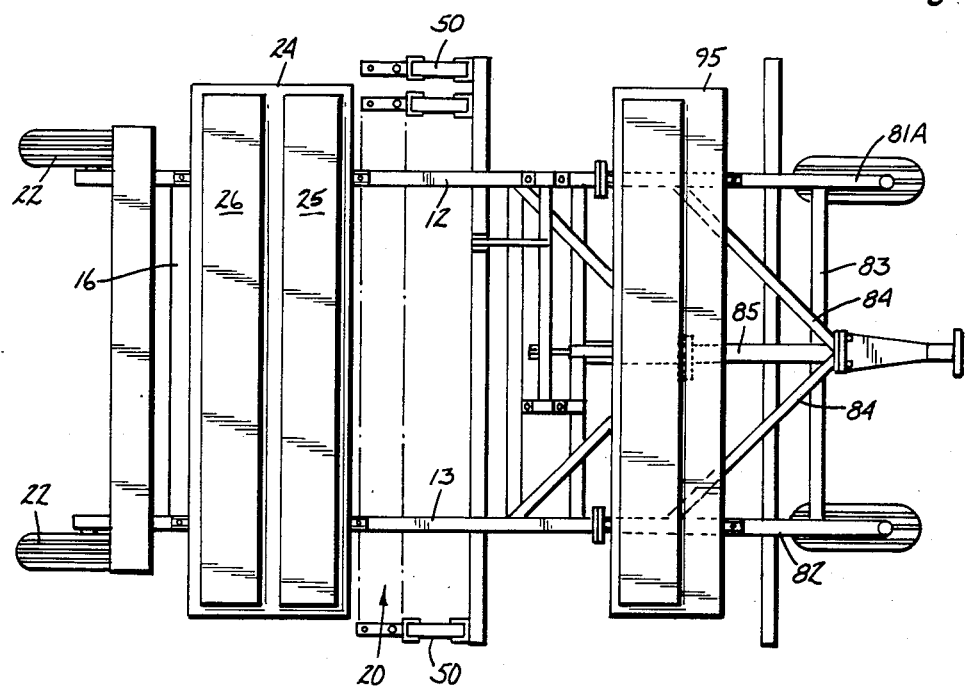
Fig. 5

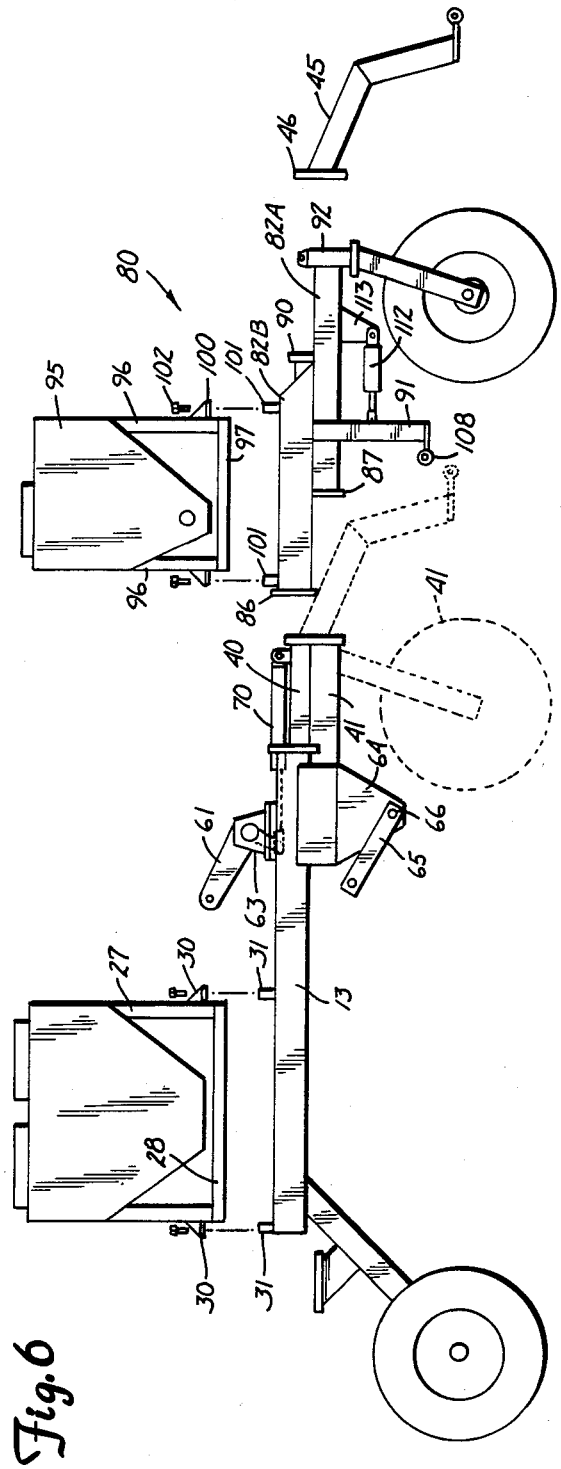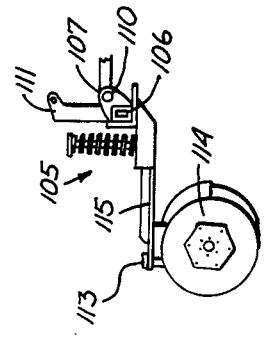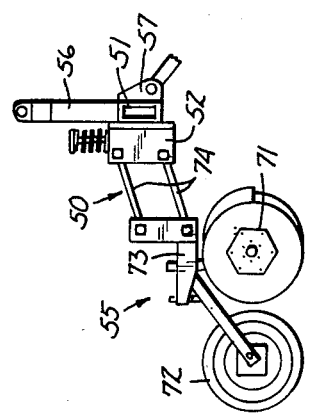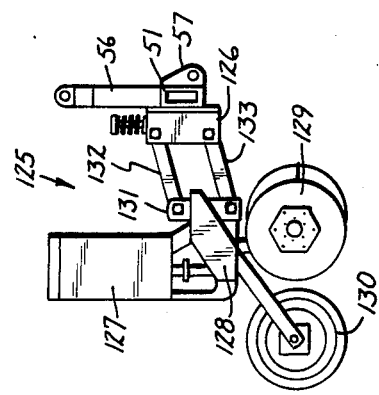

DRILL FRAME CONSTRUCTION

BACKGROUND OF THE INVENTION

1. Field of the Invention

The present invention relates to agricultural implements such as a planting apparatus for seeding, and fertilizing.

2. Description of the Prior Art

Various convertible type drills have been advanced in the past, generally using tool bar constructions with individual disc or furrow openers for providing a seed opening. For example, U.S. Pat. No. 4,311,104 shows a press grain drill that has a tool bar supporting a plurality of furrow openers, wherein the tool bar is attached to a lifting mechanism on the main frame, and is used for supporting the individual furrow openers separately. However, this device has a draft control mechanism for each individual furrow opener, and does not disclose true modular connections.

U.S. Pat. No. 4,377,979 illustrates a row crop planting system having a number of individual components such as tool bars joined together, and supported for movement over the ground. It includes forward tillage units and trailing seeding units, each of which is connected to a frame through four bar linkages.

U.S. Pat. No. 3,224,347 shows a multiple purpose tillage or soil processing machine having several individual sections for working the soil, and Pat. No. 2,657,652 illustrates a typical implement-seeder combination using chisel type furrow openers.

A soil tilling machine which includes a fertilizer spreader or seeder attachment at the rear is shown in U.S. Pat. No. 2,788,725. U.S. Pat. No. 2,951,458 illustrates a seeder box mounting and drive connection for use on cultivators.

Additionally, the present applicant's assignee has used modular drill boxes on a frame which has a removable tool bar carrying individual seeding units. The seeder assembly is mounted on a tool bar much like in U.S. Pat. No. 4,311,104, but only through a limited number of pivot connections so that it can easily be removed and replaced.

Further, individually depth controlled furrow openers using disc type openers in combination with pivoting frames are well known in the art.

Such a device is shown in U.S. Pat. No. 4,116,140, which is owned by the same assignee as this present application.

These devices show the common usage of pivoting shafts operated with hydraulic cylinders for raising and lowering tool bars, as also shown in U.S. Pat. No. 4,077,478. Thus using a tool bar that is raisable and lowerable relative to a frame through the use of hydraulic cylinders rotating a rock shaft is well known is shown only schematically in the present application. Also, individual depth control for the individual seeding mechanisms, and similar details are well known in the art and form no part of this present invention.

SUMMARY OF THE INVENTION

A modular drill frame that has a main section used as a seeder, which is normally supported with front caster wheels and rear wheels and supports either individual furrow opener planter (seeding) units, mounted onto a tool bar, or disc type openers mounted onto a tool bar that is also supported on the frame. Storage tanks are supported on the frame to provide seed, and/or fertilizer to their furrow openers.

The modular frame includes separate connection plates at the front to which an intermediate frame section may be bolted, and then caster wheels are mounted on the newly added modular section, and a hitch pole is also attached to the front of the newly added modular section.

The modular section is used for supporting a separate tool bar for side banding fertilizer, that is a unit having disc type openers that open a furrow in between two adjacent seed paths for the trailing disc openers. The side banding attachment is used for depositing either liquid or solid fertilizer in the side band furrow, and then covering the fertilizer in a suitable manner.

The ability to have a drill easily converted to one that will include a separate set of furrow openers and a supply tank for side banding fertilizer reduces the investment required, and permits options available to the farmer that permit him to use either a conventional seeding arrangement having separate furrow openers for seed and fertilizer, or a separate tool bar which had individual furrow opener and seed containers for row crop planting adjustable to desired row spacing. Either the regular seeding unit or the row crop unit is available with or without a side band attachment.

The device of the present invention locates the side band applicator ahead of the seed openers so that it will operate satisfactorily. If the side band applicator is below or behind the seeding attachments, the side band applicator may cover the seed too deeply because the disc openers used for the side band attachment will tend to make a ridge where the seed is planted.

BRIEF DESCRIPTION OF THE DRAWINGS

FIG. 4 is a schematic top plan view of the device of FIG. 1;

FIG. 5 is a schematic top plan view of the device of FIG. 2;

FIG. 6 is an exploded view, with parts that are removed from the basic frame for installation of a modular frame used for holding a side banding option shown in dotted lines;

FIG. 7 is a sectional view taken as on line 7—7 in FIG. 6;

FIG. 8 is a side elevational view of a typical planting apparatus of the present invention;

FIG. 9 is a side elevational view of a row crop planting apparatus; and

FIG. 10 is a side elevational view of the side banding applicator assembly used with the frame of the present invention.

DETAILED DESCRIPTION OF THE PREFERRED EMBODIMENT

Figure 1:
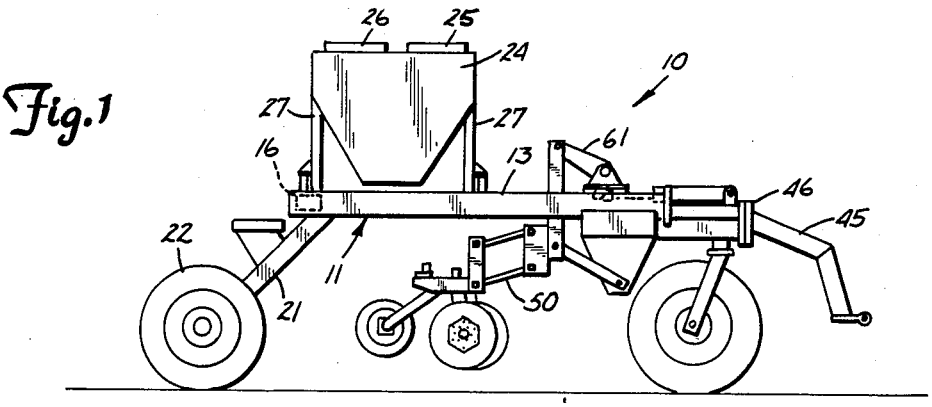
FIG. 1 is a side view of a first form of the modular drill frame of the present invention, showing the parts schematically.
Figure 2:
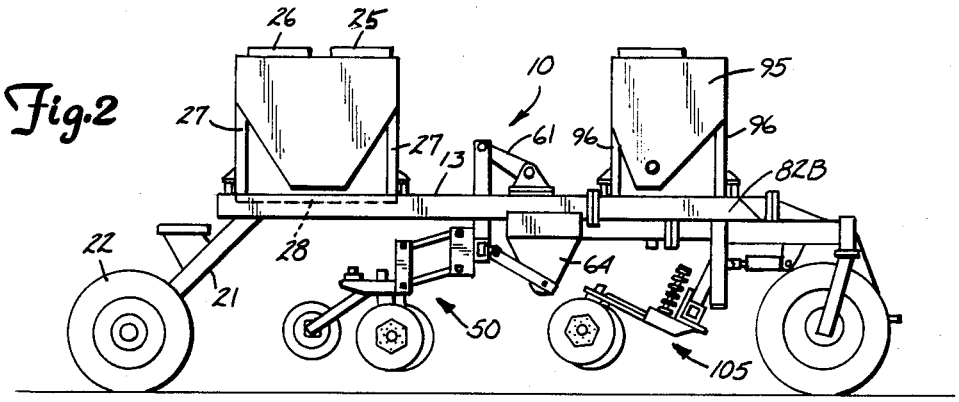
FIG. 2 is a side elevational view of the device of FIG. 1 modified to include a side banding option.

A modular drill frame assembly in a first configuration or form is shown at 10 in FIGS. 1, 4 and 5, and includes a main frame 11. The main frame 11 includes a pair of longitudinally extending main frame side members 12 and 13, which are connected together with suitable cross members at the front and rear, such as cross members 15, and a cross member 16 at the rear thereof. Additional cross members may be used if desired, to maintain rigidity, but the central frame areas indicated generally at 20 are left substantially open for attachment of tool bars carrying seeder or planting assemblies. A pair of support legs 21,21 are attached to the rear of the front fore and aft extending frame members 12 and 13, and these support legs 21 in turn mount support wheels 22 at the lower ends thereof in a conventional manner.

A supply tank 24, which includes for example a fertilizer section having a cover 25, and a seed section having a cover 26, is supported on the longitudinal extending frame members with two pairs of end upright supports 27,27. There are supports at the front and rear of the tank 26 aligned with each of the side frame members. Thus there are four of the upright members 27 for tank 24, and as shown in FIG. 6 the upright members 27 on each end of the tank are connected together with a separate fore and aft extending channel member 28, that is of size to fit over the top of the fore and aft extending frame members 12 and 13, respectively. The legs of the respective channels 28 fit over the sides of the frame members 12 and 13.

Also as shown in FIG. 6, perhaps best, there are attachment lugs 30 on each of the members 27, and the lugs 30 align with support blocks 31,31 correspondingly mounted on each of the fore and aft frame members 12 and 13. Suitable cap screws can be used for merely bolting the lugs 30 to the support blocks 31 after the fore and aft members 28 are slipped over the fore and aft extending frame members, to hold the tank assembly 24 in position on the frame, and permit its easy removal for changing. Thus only four bolts hold the tank 24 in position on the frame.

A front frame support assembly 40 is mounted to a forward cross member 15, and also to the side members 12 and 13, and comprises a pair of diagonal frame members that join together at the front end, and form a support, together with a fore and aft extending member 41 to support a caster wheel assembly 42. The caster wheel assembly 42 has a conventional shaft mounted in a suitable sleeve or housing mounted on the fore and aft member 42, to support the front edge of the frame. This caster wheel assembly is removable in a conventional manner, such as, for example having merely the central shaft that slips out of a hub for removal when desired.

At the forward ends of each of the side frame members 12 and 13 there is an attachment plate 43,43. The plates 43 have front faces that are substantially on a common plane. At the front end of the diagonal members 40 and the front member 42 there is a plate 44 that is of substantially the same configuration as plates 43, although the size may vary.

The plate 44 in the form shown in FIG. 1 is used for attaching a hitch pole 45 to which a prime mover will be connected. The hitch pole 45 has a mating plate 46 that bolts to the plate 44. A typical plate is shown in FIG. 7, and in this instance it is the plate 43 that is illustrated. The plates 43 and 44 are welded to the respective frame members, and have bolt openings adjacent their corners for receiving the bolts for attaching mating plates thereto.

In the form shown in FIG. 1, the plates 43, 43 are not in use, and they form attachment plates for a frame module for a fertilizer side banding attachment as will be further explained.

The configuration shown in FIG. 1 includes a seeder or planting tool bar assembly indicated generally at 50, which comprises a cross tool bar shown at 51 for example, (see FIG. 8). The tool bar 51 extends laterally across the machine. As shown the tool bar in turn supports a plurality of upright channel support members 52 spaced along the tool bar. The channel supports 52 are used for mounting conventional furrow opener assemblies for seeding illustrated generally at 53. The upright channels 52 are either clamped or welded to the tool bar 51 in a suitable manner, and spaced at the desired transverse spacing for seeding. While the units are shown with all of the channels 52 in line, they can be staggered in fore and aft direction for providing adequate room for the seeding assemblies 55, particularly where a seven inch on center spacing is utilized.

The tool bar assembly 50 is supported in position on the frame, through the use of four pivoting connecting arms. As shown, the tool bar 51 has a pair of upright support posts 56 which are welded or otherwise fixed to the tool bar 51, and a pair of brackets 57 are welded thereto at the lower edge thereof (see FIG. 8). These arms 56, in turn pivotally attach to the outer ends of lift arms 60 which are mounted onto a pivoting cross tube 61 suitably mounted on the fore and aft frame members. This cross tube 61 is shown only schematically, in that it is a conventional item, as are the arms 61,61. Suitable brackets 63 support the tubes 62 in position, and these are shown only schematically.

A support plate 64 is mounted to depend from the fore and aft members 12 and 13, and a link 65 is pivotally mounted as at 66 to the lower end of each of these arms. The opposite end of the link from pivot 66 is connected to the ears 67 which are fixed to the tool bar 51. Thus a four bar linkage is formed, so that when the tube 62 is rotated under power in a conventional manner, the arm 61 will rotate, and the link 65 will guide movement of the tool bar assembly 50 as the arms 61 move upwardly or downwardly. The tube 62 forms what is termed a "rock shaft" for lifting in use in many types of tillage implements.

A hydraulic cylinder shown schematically at 70 is used for pivoting the tube 62 for lifting in a conventional manner.

Each of the seeding furrow opener assemblies, as shown, comprise a double disc opener 71 of conventional design, and a depth control wheel 72 such as that shown in the prior art, that is adjustable to control the depth of the discs of the furrow opener assemblies. The double disc furrow opener assemblies 71 are mounted onto a framework 73 that is coupled to the channel 52 through a pair of parallel links 74 that may be leaf spring links, so that a spring load is exerted on the furrow openers when the cylinder 70 moves tool bar 51 through connections 56 and 57, and link arms 61 and 65 to working position.

The entire tool bar assembly of the conventional seeding furrow openers then can be removed from the arms 61 and links 65 by merely removing four bolts. The tool bar 51 and all of its attached furrow opener members will merely be removable as an assembly, and can be replaced with a separate tool bar assembly when desired. Note that the frame members 12 and 13 have high clearance, so that the tool bar itself is positioned below the frame members even in its raised (nonworking) position as shown in FIG. 1.

Thus, with the caster wheel 41 in position, and the hitch pole 45 mounted as shown in FIG. 1, the basic unit is ready for seeding. The ground drive for the metering mechanisms for driving the fertilizer and seed metering devices is not shown, but is a conventional portion as well.

When side banding of fertilizer is desired, the frame unit is convertible with a modular frame unit and extendable in fore and aft direction with very simple connections that can be done rapidly and efficiently.

Side banding of fertilizer is desirable because it tends to save fertilizer, and can be either a granular, or if desired a liquid application. Generally it is granular type fertilizer that is utilized for side banding, and the side band applicators are spaced so that they are for example 14 inches on center (with 7 inch seed row spacing) and run between the individual seed rows at every other space, so that the fertilizer being applied as a side band supplies fertilizer to two individual rows of seed. Thus, the side banding applicators can be 14 inches on center if the seed rows are seven inches on center. The side band applicators can be regulated as to depth to place the fertilizer deeper than the seed, or whereever desired for maximum efficiency.

A side band frame module is indicated generally at 80, and as shown in FIG. 5 includes a pair of fore and aft extending members 81,82 which are parallel to each other and are spaced apart corresponding to the spacing of main frame members 12 and 13. Additionally, suitable cross members 82 can be provided for holding the side members in position. Diagonal frame members 84,84 can be connected to the side members 81,82 and to each other in the center portions at the forward end of the machine. A fore and aft extending center brace 85 can be provided in the same manner as the member 42.

This modular frame assembly 80, as shown, is a self-contained unit and has an attachment plate 86 at the rear ends of each of the members 81,82 which mate with the respective plates 43. The center brace 85 has a plate 87 at the inner end thereof which is made to mate with the plate 44, and the opposite (front) end of the center brace 85 has a large plate 90 that is used for joining the front ends of diagonal braces 84,84 to the center brace 85, and also for supporting the plate 46 for the hitch pole 45 when the pole is mounted in position.

The side members 81 and 82 are made in two sections, namely forward extending sections 81A and 82A which are welded to the rear sections 81B and 82B, and are positioned below these sections. The forward sections 81A and 82A each terminate at a vertical post 91, the respective one of which is welded to the rear end of the sections 81A and 82A and also to the sections 82B and 81B. These assemblies are in line as shown, and at the forward ends of each of the members 81A and 82A there is a separate sleeve 92 that is used for supporting a caster wheel assembly 93 on each side of the frame module 80.

Thus the module frame for the side band fertilizer has two caster wheels for supporting the additional weight and distributing the weight when the extra frame module or assembly 80 is in position. The caster wheels 93 also are conventional caster wheels.

A fertilizer tank indicated generally at 95 is constructed substantially similar to the tank 24, except is a different size, and has upright columns 96 supporting it on two fore and aft extending support members 97 that are attached to the respective supports 96 at opposite ends of the tank. The members 97 align with the side frame members 81 and 82, and in fact, rest upon the tops of the frame sections 81B and 82B. Suitable support clips 100 are attached to each of the upright members 96, and these in turn align with lugs 101,101 on each of the frame sections 81B and 82B when the supports 97 are resting in place. Suitable cap screws 102 can be used for holding the tank 95 on the modular frame 80.

The tank 95 has a suitable metering mechanism for metering fertilizer stored therein to the individual side band furrow opener units, as will be explained.

The side band openers are all mounted onto a tool bar assembly that extends across the frame 80 and which is indicated generally at 105. This tool bar assembly 105 includes a tool bar 106 that has ears 107 mounted thereon which align with pivot sleeves 108 that are connected to suitable brackets at the bottom of the upright members 91. The upright members 91 form part of the modular frame and are attached to the side frame members 81 and 82. The pivot point or axis is shown at 110.

Additionally, the tool bar 106 has upright arms 111 welded thereto, which are controlled through a hydraulic cylinder assembly 112 in a conventional manner so that the pivoting about the pivot 110 is controlled by the cylinders 112. The cylinder of cylinders 112 (there may be one or more) are mounted on suitable brackets 113 connected to the modular frame 80.

Tubes 113 extend from outlets of the fertilizer tank 95 to the individual disc opener assemblies indicated at 114 to carry fertilizer to the side band units.

The disc opener assemblies 114 that are used for side banding can be conventional staggered, rotating discs that will open a furrow when forced into the ground, and a spring support 115 can be used for controlling the force with which the spring opener discs 114 engage the ground. The force for holding the discs 114 in the ground is from the cylinder 112.

The side band opener assemblies as stated are spaced an amount double the row spacings for the seed, and are used for opening furrows for depositing fertilizer that therefore provides plant food for two rows of seed.

The side banding assemblies are positioned ahead of the seeding assembly with respect to the normal direction of movement as shown, and when the plate 46 is bolted onto the plate 90 so that the hitch pole is again in position, the unit is ready to go with the individual modular tool bars for the side banding, and for seeding assemblies in position.

Figure 3:
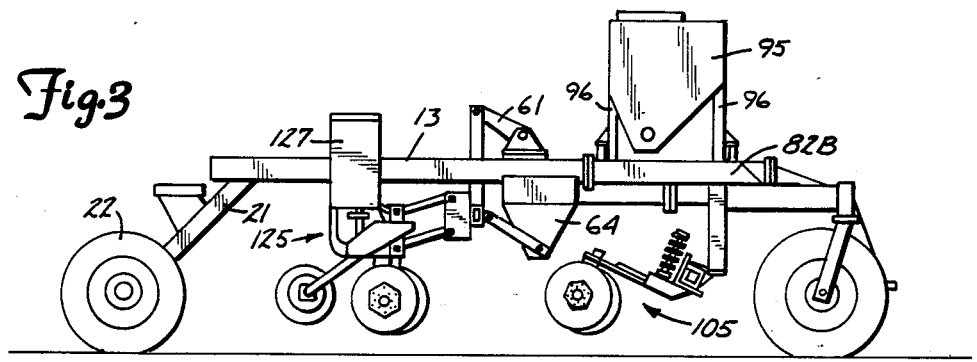
FIG. 3 is a further modified view of the device of FIG. 2 showing a planting tool bar for row crop planting installed on the unit.

As shown in FIG. 3, as an alternative to use of seed and fertilizer assemblies, individual row crop planter units 125 can be provided on the main frame. These row crop planter units use the same tool bar system as that for the normal seeding assembly, and thus the tool bar 51 for the row crop planter is shown with the same number along with the ears 57 and 56, which are used for support and for controlling its position. However, the upright channels 126 on bar 51 for the row crop planter are spaced differently if desired for row crop spacing which can be 32 inches or more on center.

The row crop planter units each include a hopper 127, a frame 128 for supporting the hopper, disc openers 129, and depth control and covering wheels 130 which are conventional units. The frame for the row crop planter units can include a forward channel 131 that is connected to the channels 126 through parallel pivoting links 132 and 133, so that the individual planter units can move up and down relative to each other without moving the tool bar 51. The links 132,133 can be spring loaded to exert a desired force to urge the disc opener of the row crop unit into the ground.

Thus in the configuration shown in FIG. 3 row crop planter units with a side banding option on the modular frame 80 are usable for row crop planting. Of course the side banding assemblies would be changed in spacing to correspond to the row crop spacing as well.

The quick change tank 24 also therefore permits removal merely by taking off the four cap screws from the lugs 30 and removing it from the lugs 31, and the fore and aft guides 28 that rest on top of the frame members are easily removed after that, so that the unit is lightened up and ready to use.

Although the present invention has been described with reference to preferred embodiments, workers skilled in the art will recognize that changes may be made in form and detail without departing from the spirit and scope of the invention.

What is claimed is:

1. In a convertible frame for converting from a planting apparatus only to a combination planting apparatus and fertilizer side banding applicator wherein the convertible frame comprises a main frame member having rear support wheels, planting means mounted on said main frame member ahead of said rear support wheels for planting seed in rows spaced laterally across the machine, a removable caster wheel support mounted at the front portion of said main frame member, and a removable hitch pole, the improvement comprising said main frame including a plurality of attachment plates fixed to the main frame member at transversely spaced locations, a side fertilizer band module frame having rearwardly facing transversely spaced plates corresponding in spacing to said forwardly facing plates on said main frame member and being positioned to mate with the forwardly facing plates when the hitch pole and caster wheel are removed from the main frame, means to fasten said forwardly facing plates and said rearwardly facing plates together, respectively, to form a rigid frame assembly, the side band module frame also having means for attachment of said hitch pole, second caster wheels mounted on said side band module frame to support the main frame and side band module frame as an assembly, and a side banding fertilizer attachment mounted on said side band module frame and positioned to precede the planting means mounted on said main frame member.

2. A convertible frame for a planting apparatus including a main frame member having rear support wheels, planting means mounted on said main frame member ahead of said rear support wheels, and a plurality of forward facing attachment plates at transversely spaced locations on said main frame member, a caster wheel support mounted at the front portion of said main frame member, and at least one of said attachment plates being used for attaching a hitch pole, a side banding module for attachment to said main frame including a side band module frame having rearwardly facing transversely spaced plates corresponding in spacing and position with said forwardly facing plates on said main frame member, second caster wheel support means adjacent the forward portion of said side band module frame, the side band module frame also having a forward facing plate for attachment of said hitch pole, a side banding fertilizer attachment mounted on said side band module frame and means for fastening forwardly facing plates on the main frame and corresponding ones of said rearwardly facing plates on the side band module frame together, whereby subsequent to the removal of the hitch pole from the one plate on the main frame the corresponding forwardly and rearwardly facing plates of the main and module frames may be joined together to make a rigid frame assembly supported at the leading end on the second caster wheel support means, and whereby after the hitch pole is attached to the forwardly facing plate on the side band module frame the assembly of the main frame and side band module frame may be moved over the ground with the side band fertilizer attachment positioned to precede the planting means mounted on said main frame.

3. The apparatus as specified in claim 2 wherein said planting means is mounted onto a first tool bar, said first tool bar being removably mounted on said main frame member at a plurality of attachment locations, a second row crop planting assembly mounted onto a second tool bar, said second tool bar having attachment locations identically positioned with respect to said first tool bar for said planting means to permit said second tool bar to be placed on said main frame in place of said first tool bar.

4. The apparatus as specified in claim 2 wherein said side banding fertilizer attachment comprises furrow openers spaced laterally across the modular frame between rows formed by the planting means.

5. The apparatus as specified in claim 2 and supply tank means for mounting on said main frame and said modular frame, each of said supply tank means comprising a support frame having at least two fore and aft extending members aligning with fore and aft extending frame members on said main and modular frames, respectively, and one bolt means at the front, and one bolt means at the rear of each of said fore and aft extending members on said tank means to provide for securing the tank means to the respective main and modular frames with only four bolts holding each tank.

6. The apparatus as specified in claim 3 wherein the main frame has a pair of longitudinally extending side frame members at the opposite sides thereof, and the forwardly facing attachment plates comprising separate forward facing plates fixedly attached at the front end of each of said longitudinally extending side frame members of said main frame member, said forwardly facing attachment plates fixed to said side frame members lying on a common plane, said modular frame having fore and aft extending frame members corresponding in spacing to the fore and aft extending frame members of said main frame member, and said modular frame having rearwardly facing plates lying on a generally common plane and adapted to be bolted to the forwardly facing plates on the respective sides of the main frame.

* * * * *

UNITED STATES PATENT AND TRADEMARK OFFICE
CERTIFICATE OF CORRECTION

PATENT NO. : 4,539,921

DATED : September 10, 1985

INVENTOR(S) : Ruben D. Morlock

It is certified that error appears in the above-identified patent and that said Letters Patent is hereby corrected as shown below:

In claim 6, line 51, the word "being" should be inserted between the words "plates" and "fixed" to read --plates being fixed--.

Signed and Sealed this

Fourteenth Day of January 1986

[SEAL]

Attest:

Attesting Officer

DONALD J. QUIGG

Commissioner of Patents and Trademarks